United States Patent
Wang

(10) Patent No.: US 8,019,980 B2
(45) Date of Patent: Sep. 13, 2011

(54) BRANCH TARGET BUFFER SYSTEM AND METHOD FOR STORING TARGET ADDRESS

(76) Inventor: Te-An Wang, Lugang Township, Changhua County (TW)

( * ) Notice: Subject to any disclaimer, the term of this patent is extended or adjusted under 35 U.S.C. 154(b) by 396 days.

(21) Appl. No.: 12/202,363

(22) Filed: Sep. 1, 2008

(65) Prior Publication Data

US 2010/0058038 A1 Mar. 4, 2010

(51) Int. Cl.
*G06F 9/32* (2006.01)
*G06F 9/34* (2006.01)
(52) U.S. Cl. .................................. 712/238; 712/240
(58) Field of Classification Search .................. 712/238, 712/240
See application file for complete search history.

(56) References Cited

U.S. PATENT DOCUMENTS

| | | | | |
|---|---|---|---|---|
| 6,108,773 | A | * | 8/2000 | Col et al. ...................... 712/237 |
| 6,578,134 | B1 | * | 6/2003 | Van Dyke et al. ............ 712/219 |
| 6,625,717 | B2 | * | 9/2003 | Douglas et al. ............... 711/213 |
| 7,117,347 | B2 | * | 10/2006 | Col et al. ...................... 712/239 |

* cited by examiner

*Primary Examiner* — Daniel Pan

(57) ABSTRACT

A branch target buffer (BTB) system and method for storing target address is provided. The BTB system is applicable to a 16-bit, 32-bit, 64-bit or higher processor architecture. When the target address of the branch instruction is stored, the BTB stores the variation range, carry bit and sub/add bit of the target address without having to store all the bits of the target address. Because the BTB does not need to store the identical part of the branch instruction address and the target address, the number of bits of the target address field for the BTB of the processor needs to be stored is reduced. Although less number of bits are stored for the target address field, the BTB system is able to generate a complete target address without affecting the computation performance.

8 Claims, 9 Drawing Sheets

Offset target [24:0] (use ARM instruction set as example)

Carry = OR(branch instruction[31:25] XOR target address [31:25])
Sub/add = branch instruction[23]
Variation range of target address = target address[24:2]

BRANCH TARGET BUFFER SYSTEM AND METHOD FOR STORING TARGET ADDRESS

BACKGROUND OF THE INVENTION

1. Field of the Invention

The present invention generally relates to a branch target buffer (BTB) of a processor of computer architecture, and more specifically to a branch target buffer system and method for storing target address, applicable to a 16-bit, 32-bit, 64-bit or higher processor architecture. When the target address of the branch instruction is stored, the BTB stores the variation range, carry bit and sub/add bit of the target address without having to store all the bits of the target address, for reducing the number of bits of the target address field for the BTB of the processor.

2. The Prior Arts

The branch target buffer (BTB) is for storing the target address of the branch instruction, and is often used to determine whether an instruction is a branch instruction. If an instruction is determined to be a branch instruction, the branch predictor will determine whether the branch instruction will be taken or not, based on the branch history of the branch instruction. If the branch predictor predicts that a branch will be taken, the target address field of the BTB will provide the target address for the program to continue.

FIG. 1 shows a schematic view of the operation of a conventional BTB for storing the target address of a branch instruction. As shown in FIG. 1, a BTB 10 stores the history of a target branch. The BTB 10 has a plurality of entries 101. The number of entries can be, for example, 512 (512-entry).

Each entry 101 of the BTB 10 includes a tag 102, and a data 103. The tag 102 is the [31:9]-bit of the branch instruction address that is previously executed, and the data 103 includes a target address ([31:0]) 104 of a previously executed branch instruction, and a 2-bit history information 105.

The BTB 10 will fetch the current instruction address and check whether the instruction address is a branch instruction previously executed. The [8:2]-bit of the current address is used to read the tag 102, and compared to the [31:9]-bit of the current instruction address. If the tag of the current branch instruction address is the same as the tag 102 in the cache, the 2-bit history information 105 in the data 103 will indicate that the branch instruction is often fetched, and the BTB 10 will use the target address 104 as the instruction address to be passed to the instruction cache. The 2-bit history information 105 of the data 103 represents four possibilities of the entry 101 of the BTB 10.

In conventional technology, when the BTB stores the target address of the branch instruction, the BTB must store all the bits of the target address. Therefore, the large number of bits of the BTB prevents the chip size and the power consumption from reduction. Therefore, it remains a problem to be solved for the development of a BTB with smaller number of bits and applicable to a 16-bit, 32-bit, 64-bit, or even higher processor architecture to generate a complete target address to achieve the computation performance as well as reduce the chip size and power consumption.

SUMMARY OF THE INVENTION

The primary objective of the present invention is to provide a branch target buffer (BTB) system and method for storing target address, applicable to a 16-bit, 32-bit, 64-bit or higher processor architecture. When the target address of the branch instruction is stored, the BTB stores the variation range, carry bit and sub/add bit of the target address without having to store all the bits of the target address.

Another objective of the present invention is to provide a BTB system and method for storing target address, applicable to a 16-bit, 32-bit, 64-bit or higher processor architecture, for reducing the number of bits of the target address field for the BTB of the processor by not storing the identical part of the branch instruction address and the target address.

Yet another objective of the present invention is to provide a BTB system and method for storing target address, applicable to a 16-bit, 32-bit, 64-bit or higher processor architecture, for reducing the number of bits of the target address field for the BTB of the processor while ensuring the complete target address is generated without sacrificing the computation performance.

To achieve the above objectives, the present invention provides a novel BTB system and method for storing target address, applicable to a 16-bit, 32-bit, 64-bit or higher processor architecture. The BTB system includes a BTB, an instruction address increment unit, and an instruction address decrement unit. The BTB stores the variation range, carry bit and sub/add bit of the target address. According to different values of carry bit and sub/add bit, the instruction address increment unit can increment some part of the arrived instruction address, the instruction address decrement unit can decrement some part of the arrived instruction address, or neither the instruction address increment unit nor the instruction address decrement unit executes any operation. After the instruction address increment unit or the instruction address decrement unit increments or decrements the part of the target address, the computation result is returned to the BTB.

While the BTB is looked up, the instruction address increment unit can perform increment to the part above the variation range of the target address, or the instruction address decrement unit can perform decrement to the part above the variation range of the target address.

When applying the BTB method for storing target address of the present invention, the BTB stores the variation range, carry bit and sub/add bit of the target address without having to store all the bits of the target address, and the present invention can reduce the number of bits of the target address field for the BTB of the processor while ensuring the generation of the complete target address without sacrificing the computation performance.

The BTB method for storing the target address of the present invention includes the steps of: determining and setting the identical address field part of the branch instruction address and the target address; while the BTB is looked up, using the instruction address increment unit to increment some part of the arrived instruction address, or the instruction address decrement unit to decrement some part of the arrived instruction address, or neither the instruction address increment unit nor the instruction address decrement unit to execute any operation according to the determined values of the carry bit and sub/add bit, where the some part of the instruction address is the part above the variation range of the target address; after the instruction address increment unit or the instruction address decrement unit executing, returning the computation result to the BTB; and the BTB combining the identical part of the branch instruction address and the target address and the computed part above the variation range of the target address to form the target address and outputting the target address.

The BTB system and method for storing target address of the present invention uses less number of bits to achieve the same objective while reducing the chip size and power consumption. The present invention is applicable to 16-bit, 32-bit, 64-bit or higher processor architecture. Take the 32-bit MIPS instruction set as an example. By using the present invention, each target address field can reduce 15 bits. In other words, the original 32-bit field for storing the target address can be replaced by a 17-bit field in the present invention, a 46.88% reduction in the total number of bits. Also, take the 32-bit ARM instruction set as an example. By using the present invention, each target address field can reduce 7 bits. In other words, the original 32-bit field for storing the target address can be replaced by a 25-bit field in the present invention, a 21.88% reduction in the total number of bits. The BTB system and method for storing target address of the present invention is applicable to any instruction set, and demonstrates different maximum save of bits for different instruction sets.

For a 512-entry BTB and 32-bit MIPS instruction set, the total number of bits saved is 7680 (15*512), and for 32-ARM instruction set, the total number of bits saved is 3584 (7*512). For 64-bit or higher processor architecture, more bits can be saved. Also, the more entries the BTB has, the more the bits are saved.

The major features of the BTB method for storing target address of the present invention are: (a) storing the offset target instead of the entire target address; the offset target including three parts: variation range, carry bit, and sub/add bit of the target address, where in the present invention, the offset target replacing the 32-bit target address to be stored in the BTB, and the total number of bits of the offset target is the number of bits of the variation range plus 2 bits; and (b) using the instruction address increment unit and the instruction address decrement unit to perform increment or decrement to the part above the variation range of the branch instruction address while the BTB is looked up.

For (a), the number of bits of the variation range of the target address in the offset target is not fixed, and is the number of bits of the offset field of the branch instruction format of the instruction set minus the sign bit. If the variation range of the target address in the offset target stores more bits, the less bits are computed by the instruction address increment unit and the instruction address decrement unit that increments or decrements the part above the variation range of the instruction address, accordingly.

For (b), the increment or decrement to the part above the variation range of the branch instruction address can be accomplished by adder or counter.

The foregoing and other objectives, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

Figure 1:
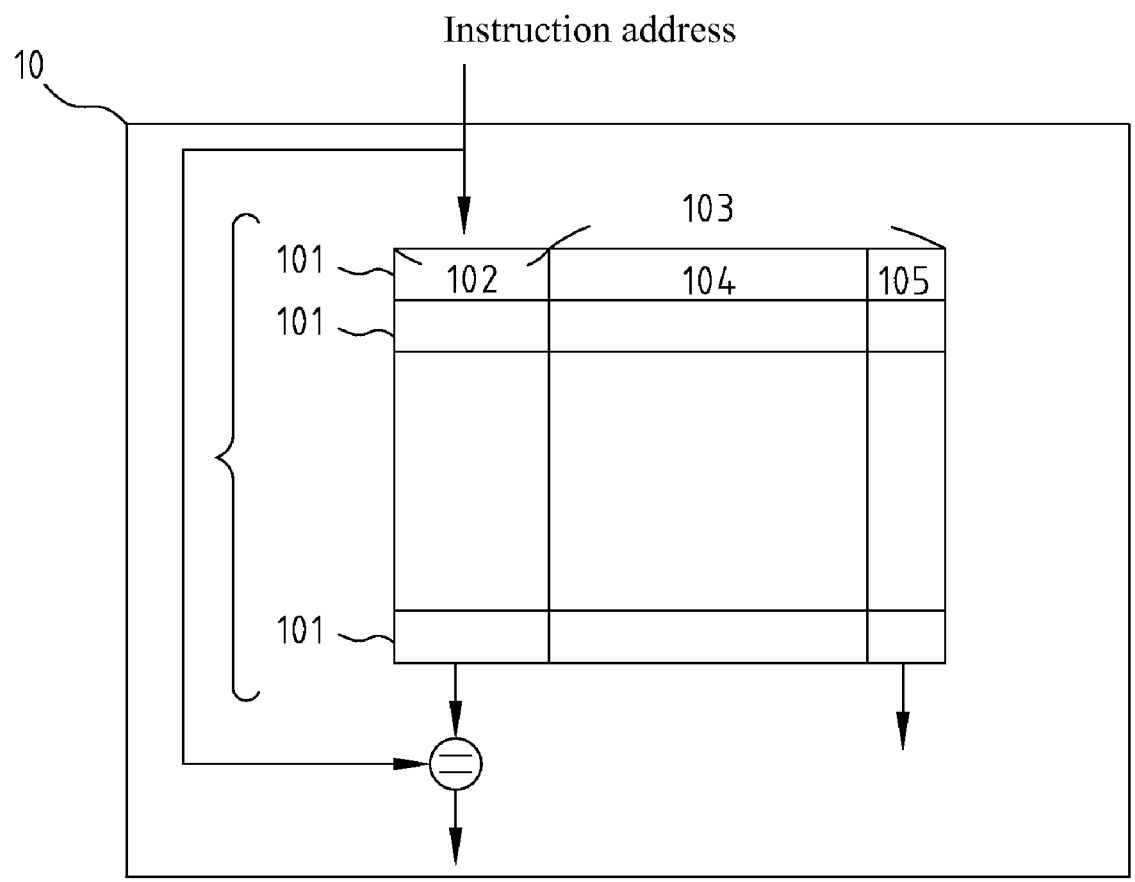
FIG. 1 shows a schematic view of the operation of a conventional BTB for storing the target address of a branch instruction.
Figure 2:
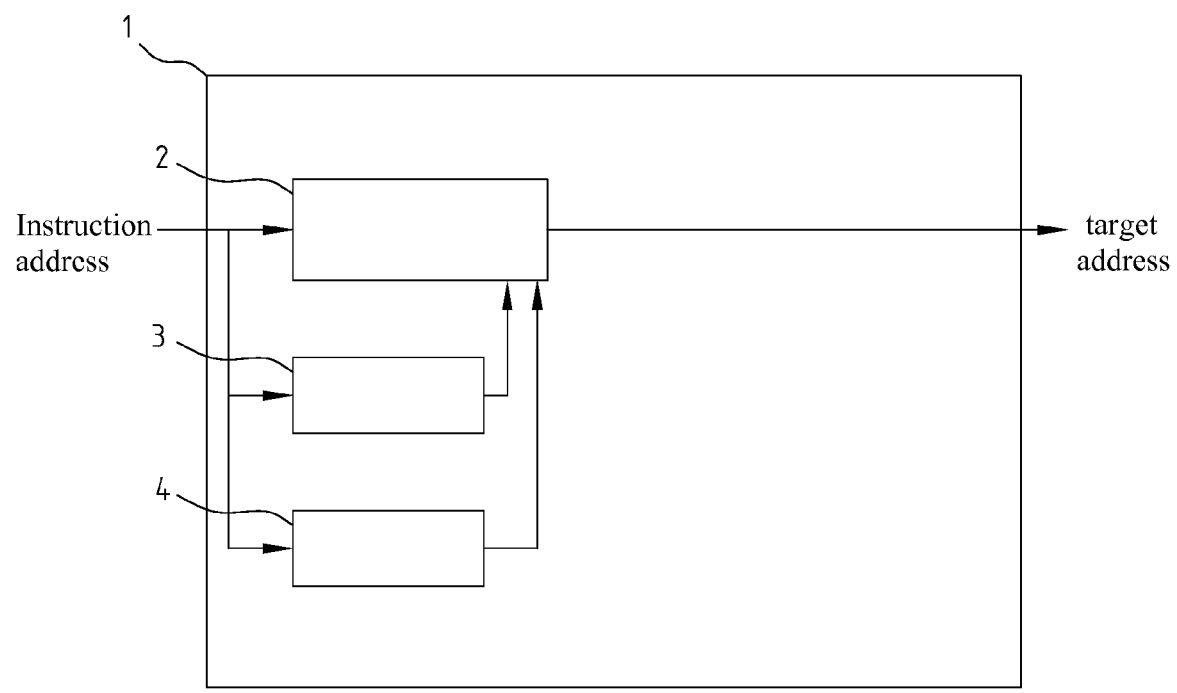
FIG. 2 shows a block diagram of a BTB system for storing target address according to the present invention.

FIG. 2 shows a block diagram of a BTB system for storing target address according to the present invention. The present invention is applicable to a 16-bit, 32-bit, 64-bit or higher processor architecture. As shown in FIG. 2, The BTB system 1 includes a BTB 2, an instruction address increment unit 3 and an instruction address decrement unit 4.

The BTB 2 is for storing the variation range, carry bit and sub/add bit of the target address. According to different values of carry bit and sub/add bit, the instruction address increment unit 3 can increment some part of the arrived instruction address, the instruction address decrement unit 4 can decrement some part of the arrived instruction address, or neither the instruction address increment unit 3 nor the instruction address decrement unit 4 executes any operation. After the instruction address increment unit 3 or the instruction address decrement unit 4 increments or decrements the part of the target address, the computation result is returned to the BTB 2.

While the BTB 2 is looked up, the instruction address increment unit 3 can perform increment to the part above the variation range of the target address, or the instruction address decrement unit 4 can perform decrement to the part above the variation range of the target address.

Take the 32-bit instruction address as an example. When the instruction address is used to look up the BTB 2, the instruction address is also sent to the instruction address increment unit 3 and the instruction address decrement unit 4. The instruction address increment unit 3 can perform increment to the part above the variation range of the target address. In this case, the instruction address increment unit 3 increments the [31:25] bits part ([31:25]+1). Or, the instruction address decrement unit 4 can perform decrement to the part above the variation range of the target address. In this case, the instruction address decrement unit 4 decrements the [31:25] bits part ([31:25]−1).

After the instruction address increment unit 3 increments some part of the instruction address ([31:25]+1), or the instruction address decrement unit 4 decrements some part of the instruction address ([31:25]−1), the computation result will be returned to the BTB 2.

Figure 3:
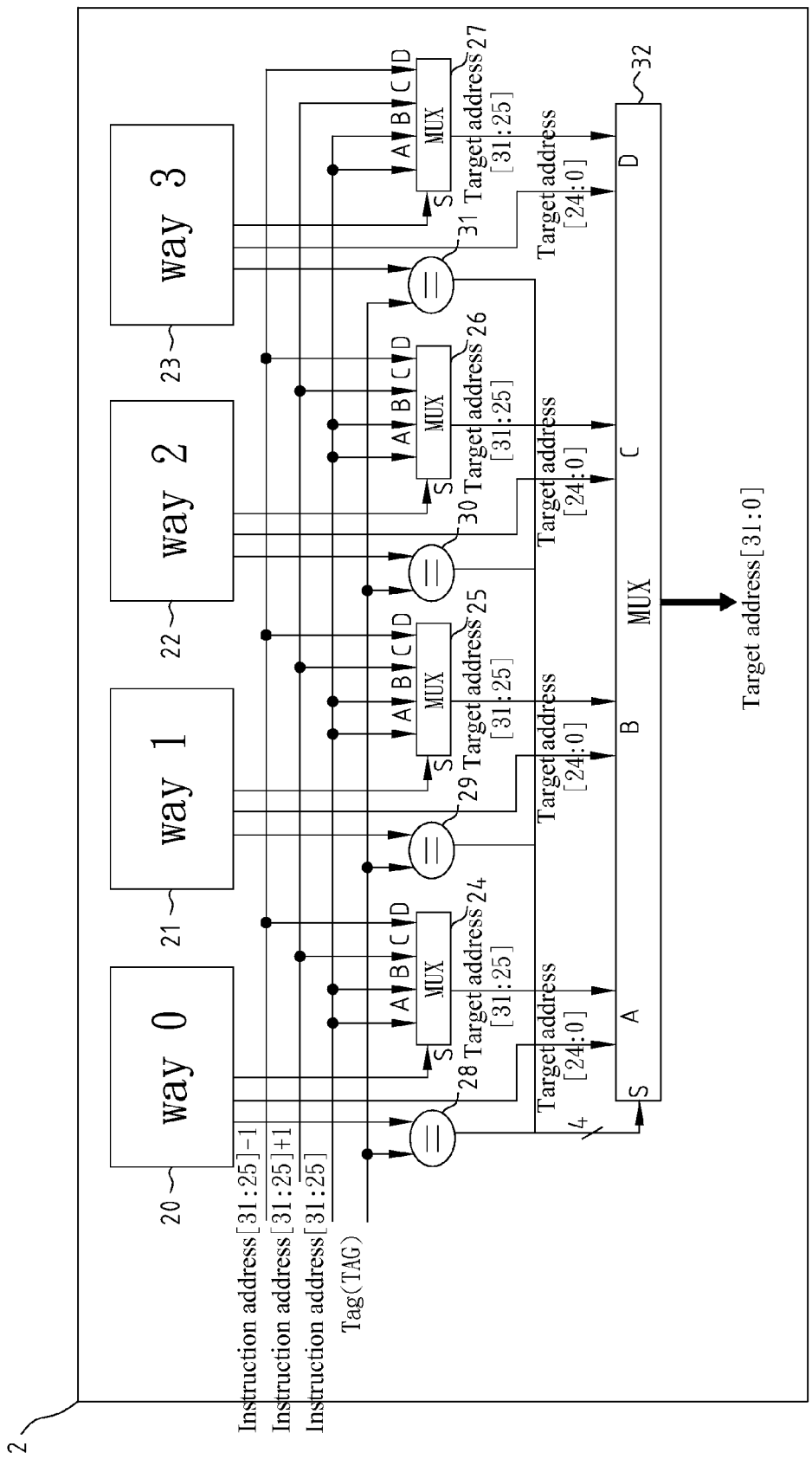
FIG. 3 shows an embodiment of a BTB of the BTB system for storing target address in FIG. 2.

FIG. 3 shows an embodiment of the BTB of the BTB system for storing target address of FIG. 2. As shown in FIG. 3, the BTB 2 includes a module 20 (way 0), a module 21 (way 1), a module 22 (way 2), a module 23 (way 3), a multiplexer 24, a multiplexer 25, a multiplexer 26, a multiplexer 27, a mechanism 28, a mechanism 29, a mechanism 30, a mechanism 31, and a multiplexer 32.

According to carry bit and sub/add bit, each of the module 20 (way 0), the module 21 (way 1), the module 22 (way 2) and the module 23 (way 3) sends a selection signal S to the multiplexer 24, the multiplexer 25, the multiplexer 26 and the multiplexer 27, separately. According to selection signal S, each of the multiplexer 24, the multiplexer 25, the multiplexer 26 and the multiplexer 27 selects the [31:25] bits part of the instruction address that has been decremented by 1 ([31:25]−1), the [31:25] bits part of the instruction address that has been incremented by 1 ([31:25]+1), or the [31:25] bits part of the instruction address that has neither been decremented nor incremented ([31:25]), and returns the selected [31:25]−1, [31:25]+1 or [31:25] bits of the instruction address to the multiplexer 32.

The part above the variation range of the target address, i.e., [31:25] bits of target address ([31:25] bits of instruction address) is then combined with the variation range of the target address, i.e., [24:0] bits of the target address, where the 0-th bit and the first bit of the target address are set to 0 directly. Each of the mechanism 28, the mechanism 29, the mechanism 30 and the mechanism 31 separately compares the tag from the module 20 (way 0), the module 21 (way 1), the module 22 (way 2) and the module 23 (way 3) with the tag of the current instruction address. Then, according to the comparison result, the multiplexer 32 selects a target address to be read for output, i.e., the 32-bit target address corresponding to the branch instruction.

Figure 4:
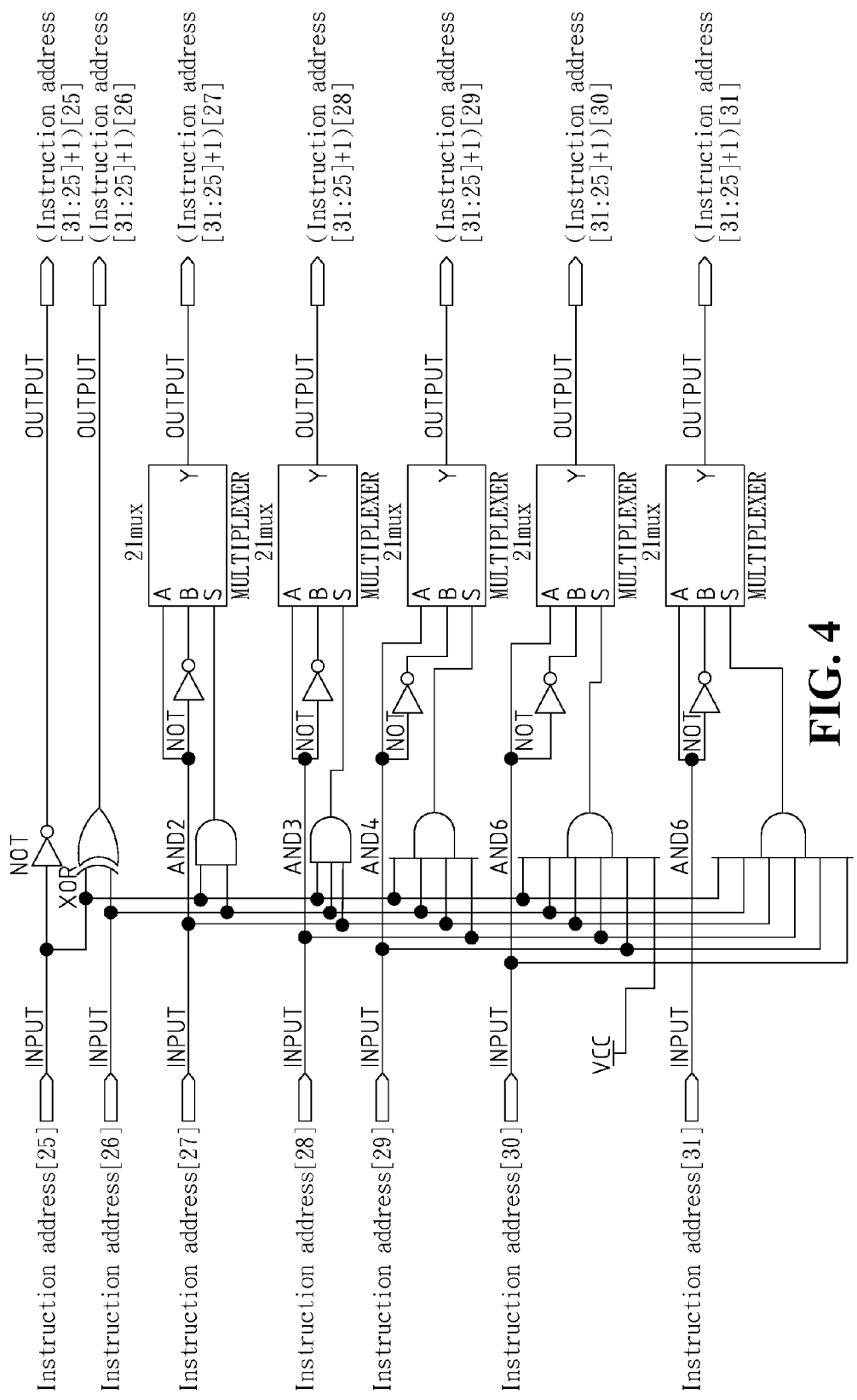
FIG. 4 shows an embodiment of an instruction address increment unit of the BTB system for storing target address in FIG. 2.

FIG. 4 shows an embodiment of the instruction address increment unit of the BTB system for storing target address in FIG. 2. As shown in the functional units of the instruction address increment unit 3 (instruction address [31:25]+1) of FIG. 4, the computation on each bit is independent and requires short computation time so that the increment by 1 operation can be accomplished in the predefined time.

Figure 5:
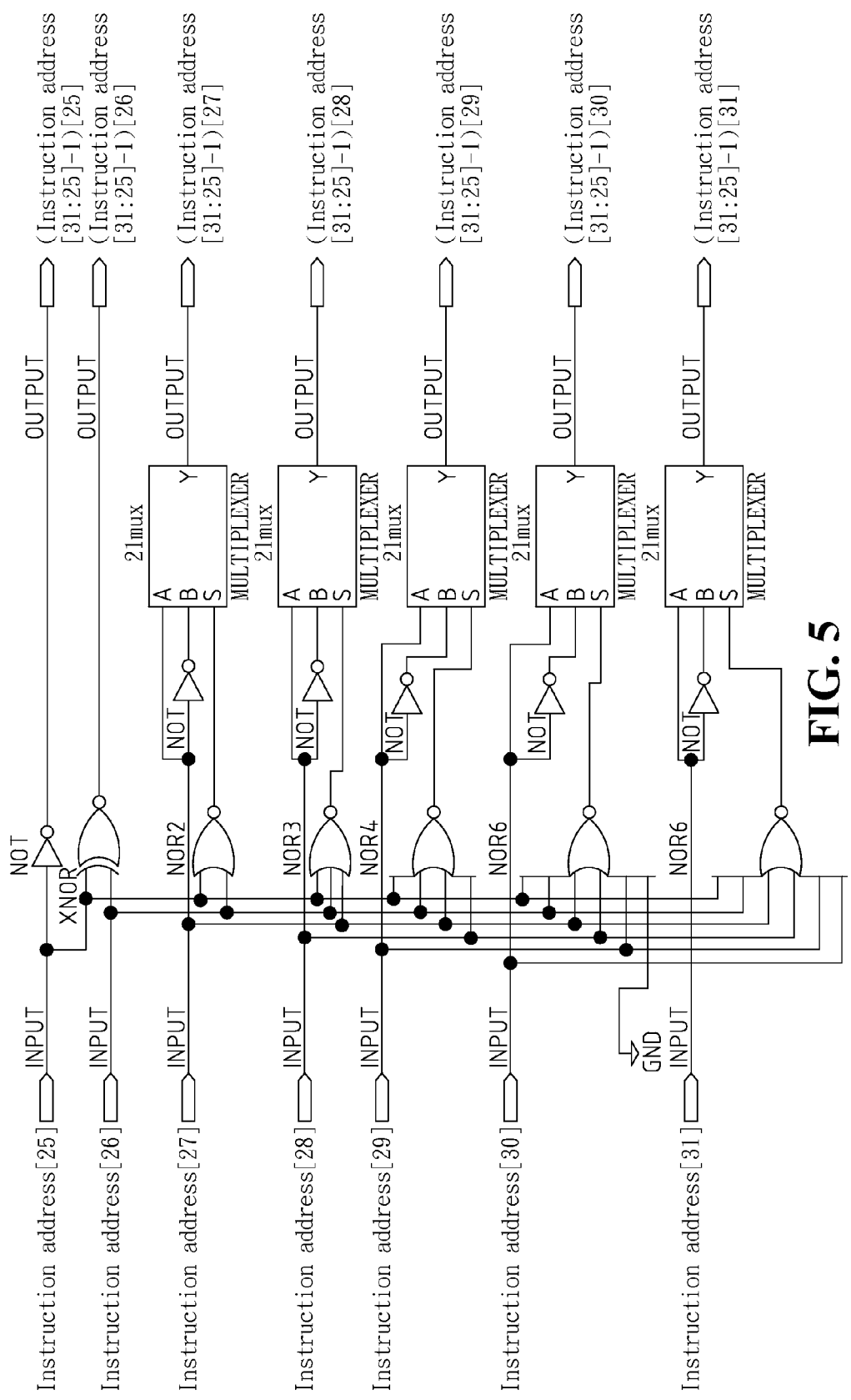
FIG. 5 shows an embodiment of an instruction address decrement unit of the BTB system for storing target address in FIG. 2.

FIG. 5 shows an embodiment of the instruction address decrement unit of the BTB system for storing target address in FIG. 2. As shown in the functional units of the instruction address decrement unit 4 (instruction address [31:25]−1) of FIG. 5, the computation on each bit is independent and requires short computation time so that the decrement by 1 operation can be accomplished in the predefined time.

Figure 6:
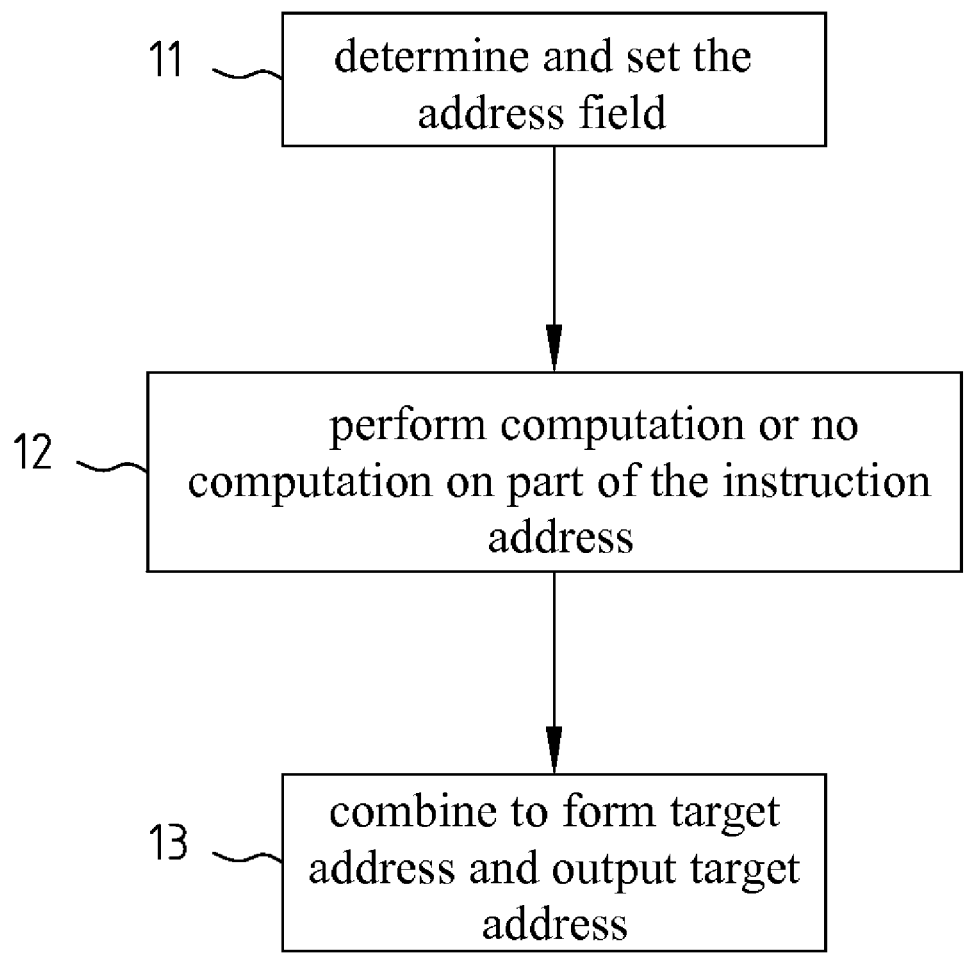
FIG. 6 shows a flowchart of a BTB method for storing target address according to the present invention.

FIG. 6 shows a flowchart of a BTB method for storing target address according to the present invention. As shown in FIG. 6, step 11 is for the BTB system 1 to determine and set the identical part of the branch instruction address and the target address, and afterwards the method proceeds to step 12.

In step 12, while the BTB 2 is looked up, the instruction address increment unit 3 increments some part of the arrived instruction address, or the instruction address decrement unit 4 decrements some part of the arrived instruction address, or neither the instruction address increment unit 3 nor the instruction address decrement unit 4 executes any operation according to the determined values of the carry bit and sub/add bit, where the some part of the instruction address is the part above the variation range of the target address; after the instruction address increment unit 3 or the instruction address decrement unit 4 executes the increment or decrement by 1, the computation result is returned to the BTB 2; and then the method proceeds to step 13.

In step 13, the BTB 2 combines the identical part of the branch instruction address and the target address and the computed part above the variation range of the target address to form the target address and outputting the target address.

The present invention exploits the identical part of the branch instruction address and the target address so that the identical part will not be stored in the BTB 2, and therefore accomplishes the objective of reducing the number of bits of the target address field. The identical part in the target address and the branch instruction address is determined by the branch instruction format of the instruction set.

Figure 7:
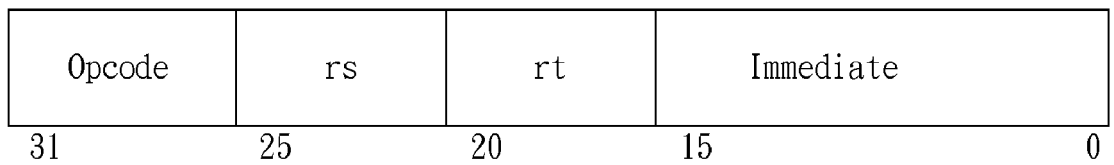
FIG. 7 is a schematic view showing a branch instruction format of a 32-bit MIPS instruction set.
Figure 8:
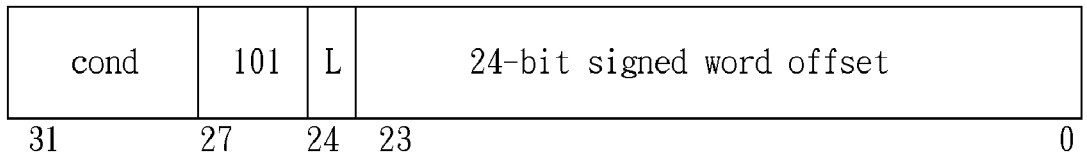
FIG. 8 is a schematic view showing a branch instruction format of a 32-bit ARM instruction set.

FIG. 7 is a schematic view showing the branch instruction format of a 32-bit MIPS instruction set. FIG. 8 is a schematic view showing the branch instruction format of a 32-bit ARM instruction set. In the following, the first example is the jump range of the branch instruction of the 32-bit MIPS instruction set, the second example is the jump range of the branch instruction of the 32-bit ARM instruction set, and the third example is the description of the jump to the relative address of the branch instruction of the 32-bit MIPS instruction set. The three examples show that the jump distance of the branch instruction is within a fixed range, and the offset value is also restricted. In addition, the jump ranges of different instruction sets may also be different.

Example 1

BNE R3, R4, name if (Regs[R3]!=Regs[R4]) PC←name;

$((PC+4)-2^{17})<=name<((PC+4)+2^{17})$ where, in FIG. 7, the value in the immediate field of the branch instruction format of the MIPS instruction set is the value of the offset.

Example 2

BEQ name if (Z set) PC←name;

$((PC+8)-2^{25})<=name<((PC+8)+2^{25})$ where, in FIG. 8, the value in the offset field of the branch instruction format of the ARM instruction set is the value of the offset.

Example 3 j $rt

The following fourth example is a simple example of less bits. Take the 32-bit MIPS instruction set as an example. Two binary numbers with different numbers of bits are added, where the offset of case 1 is the maximum positive number and the offset of case 2 is the minimum negative number. The offset of maximum positive number (01111) is 5-bit long with positive sign bit 0, and the offset of minimum negative number (10000) is also 5-bit long with negative sign bit 1. Before addition, the offsets of case 1 and case 2 must be shifted to the left by 2 bits. The vacancy created by shifting left two bits is set to 0. At this point, each offset is 6-bit long. However, as the sign bit of the offset is only 1 bit, the sign extension must be performed before the addition with "branch instruction address +4". Therefore, the sign bit of the offset will be extended to 4 bits, and the computation result will be the target address. The reason why that the change of branch instruction address is 4 each time is that the $0^{th}$ and first bits are byte offset. The target address is, from right to left, the 0-9 bits, where the part above the variation range of the offset is the 6-9 bits, and the 6th bit is the sign bit of the offset, and the remaining 7-9 bits are the sign extended.

Example 4

(from right to left, the 0-9 bits)

Sign bit ↓ variation range

Case 1
```
 1011|110000    branch instruction address + 4
+0000|111100    offset
─────────────
 1100|101100    target address
```

Case 2
```
 1011|110000    branch instruction address + 4
+1111|000000    offset
─────────────
 1010|110000    target address
```

It can be seen that when a carry bit occurs, the situation where the parts above the variation range, i.e., 6-9 bits, of the two will be different by 1; otherwise, no difference different will occur.

Figure 9:
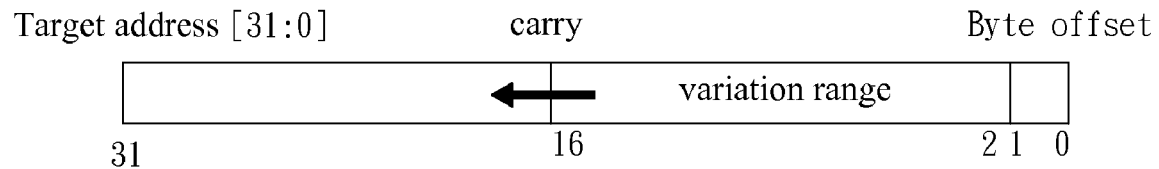
FIG. 9 is a schematic view showing the comparison of the branch instruction address and the target address in the 32-bit MIPS instruction set.
Figure 10:
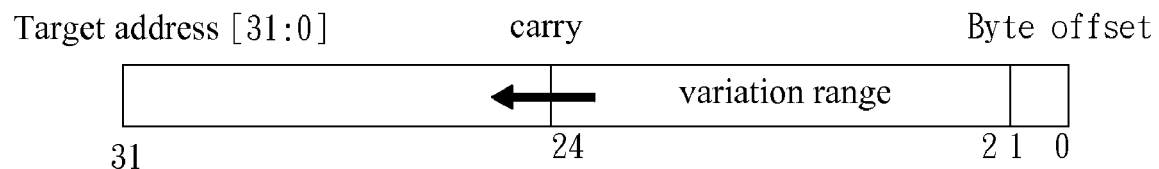
FIG. 10 is a schematic view showing the comparison of the branch instruction address and the target address in the 32-bit ARM instruction set.

FIG. 9 is a schematic view showing the comparison between the branch instruction address and the target address in the MIPS instruction set. FIG. 10 is a schematic view showing the comparison between the branch instruction address and the target address in the ARM instruction set. As shown in FIGS. 9 and 10, the difference between the branch instruction address and the target address is in the variation range. The part above the variation range of the target address will be identical to that part of the original branch instruction address if no carry occurs. On the other hand, if a carry occurs, the part of the variation of the target address will be different by +1 or −1.

The byte offset will not be changed because the PC adds 4 each time. Therefore, it only requires to store the variation range plus two additional bits for recording whether a carry has occur and whether to add 1 or subtract 1 so as to generate a 32-bit target address.

Figure 11:
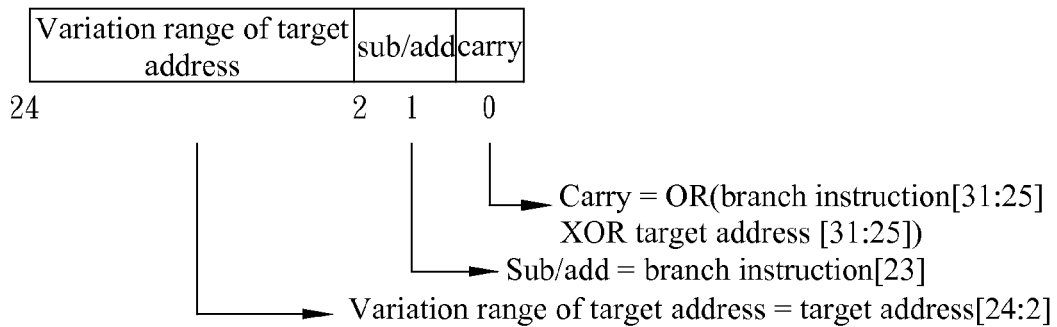
FIG. 11 is a schematic view showing an offset target format of the ARM instruction set.

The present invention is applicable to the BTB of different types of instruction sets. The following description uses the 32-bit ARM instruction set as an example, but other instruction sets are also within the scope of the description. The present invention uses offset target to replace the 32-bit target address originally stored in the BTB. The format of the offset target is shown in FIG. 11. FIG. 11 is a schematic view of the offset target format of the ARM instruction set, where the variation range of the target address is obvious and the description is omitted.

Carry bit is for determining whether a carry has occurred to the part above the variation range of the target address, i.e., a carry to the 25th bit and above, to affect the value of 25-31 bits. By comparing the 25-31 bits of the branch instruction address and the 25-31 bits of the target address, if any corresponding bit is different, a carry has occurred. The computation equation of the carry bit in FIG. 11 is to determine whether the 25-31 bits of the branch instruction address and the 25-31 bits of the target address are different. If both are identical, the carry bit is 0 and no carry has occurred; otherwise, the carry bit is 1 and a carry has occurred. The sub/add bit is determined by the positivity and negativity of the offset of the original branch instruction. If positive, the sub/add bit is 0; otherwise, the sub/add bit is 1. The following describes the algorithm of using the offset target to obtain the 32-bit target address.

Line 1: target address[24:2]=offset target[24:2]
Line 2: If ((Carry==1) && (Sub/add==1))
Line 3: target address[31:25]=pc[31:25]−1;
Line 4: else if ((Carry==1) && (Sub/add==0))
Line 5: target address[31:25]=pc[31:25]+1;
Line 6: else
Line 7: target address[31:25]=pc[31:25];
Line 8: target address[1:0]=pc[1:0];

where in Line 1, the [24:2] bits of the offset target is set as the [24:2] bits of the target address, in Line 2, it is determined whether the carry bit is 1 and whether the sub/add bit is also 1, if both carry bit and sub/add bit are 1, proceed the algorithm proceeds to Line 3; if the carry bit is 0, the algorithm proceeds to Line 7; in Line 4, if the carry bit is 1 and the sub/add bit is 0, the algorithm proceeds to Line 5; and after Lines 2-7, the algorithm proceeds to Line 8.

Figure 12:
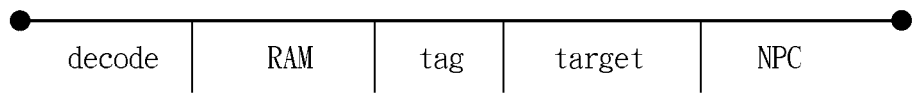
FIG. 12 is a schematic view showing a time line of a conventional BTB access time.

FIG. 12 is a schematic view showing a time line of a conventional BTB access time. As shown in FIG. 12, the conventional BTB access time includes decoding to select which set of RAM to access, then reading each data of the corresponding set of the RAM, comparing the tag of each data, then according to the comparison result, using the multiplexer to select the actual target address, and finally sending target address to NPC (next PC).

In the present invention, the increment or decrement operation on the part above the variation range of the target address must be completed before the comparison of the tag; therefore, no extra time delay is introduced into the system.

The following defines the terms used in the present invention:

1. Target address is the destination address to which the branch instruction jumps to.
2. [31:25] bits of instruction address refer to the 25th bit to the 31st bit of the 32-bit instruction address, 7 bits in total, and so on.
3. Branch target buffer (BTB) is for storing the target address corresponding to the branch instruction.
4. The immediate field in the format of the branch instruction of MIPS instruction set and the offset field in the format of the branch instruction of the ARM instruction set are the offset of the present invention.
5. The offset target is used by the present invention to replace the 32-bit target address to be stored in the BTB so as to reduce the number of bits to be stored. The number of bits of the offset target is the number of bits of the variation range plus 2 bits.
6. The branch predictor is to determine whether the branch instruction will be taken or not according to the jump history of the branch instruction.
7. The variation range is the main difference between the branch instruction address and the target address. According to the present invention, the number of bits of the variation range is the number of bits of the offset field in the branch instruction format of the instruction set minus the sign bit.
8. Byte offset is the 0th and the first bit of the instruction address. It is fixed in the 32-bit instruction set, and in the 64-bit instruction set, the byte offset has 3 bits that are fixed (the bit number of the present invention starts at 0).
9. In the FIGS., a circle dot between the lines implies that the two lines are connected; otherwise, the lines are not connected.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A branch target buffer (BTB) method for storing an address variation field of a complete target address of a branch instruction and reconstructing the complete target address in an architecture having a plurality of branch target buffer entries stored in a branch target buffer system, comprising the steps of:
dividing said complete target address into said address variation field and an identical field, said address variation field being determined by a maximum address variation range that said complete target address varies from an instruction address of said branch instruction and said identical field covering a number of identical address bits between said complete target address and said instruction address of said branch instruction;
storing said address variation field, a carry bit and a sub/add bit in a branch target buffer entry, said carry bit and said sub/add bit being determined based on whether a carry bit is needed, and whether a subtraction/addition operation is needed to generate said complete target address from said identical field and said address variation field;
computing a partial address field from a coming instruction address by incrementing, decrementing or unchanging the identical field in said coming instruction address according to said carry bit and said sub/add bit from said branch target buffer entry when said branch instruction needs to jump to said complete target address; and
reconstructing said complete target address by combining said partial address field and said address variation field from said branch target buffer entry.

2. The method as claimed in claim 1, wherein said maximum address variation range has a number of bits equal to the number of bits of an address offset field of said branch instruction minus a sign bit.

3. The method as claimed in claim 2, wherein said address variation field is the 17th bit to 31st bit of a 32-bit instruction address starting at 0th bit.

4. The method as claimed in claim 2, wherein said address variation field is the 25th bit to 31st bit of a 32-bit instruction address starting at 0th bit.

5. A branch target buffer (BTB) system for storing an address variation field of a complete target address of a branch instruction and reconstructing the complete target address, comprising:
a branch target buffer having a plurality of branch target buffer entries for storing in each entry an address variation field, a carry bit and a sub/add bit, said address variation field being determined by a maximum address variation range that said complete target address varies from an instruction address of said branch instruction by excluding an identical field covering a number of identical address bits between said complete target address and said instruction address, and said carry bit and said sub/add bit being determined based on whether a carry bit is needed, and whether a subtraction/addition operation is needed to generate said complete target address from said identical field and said address variation field;
an address incrementing unit and an address decrementing unit for computing a partial address field from a coming instruction address by incrementing, decrementing or unchanging the identical field in said coming instruction address according to said carry bit and said sub/add bit of a corresponding branch target buffer entry when said branch instruction needs to jump to said complete target address; and
a plurality of multiplexers for reconstructing said complete target address by combining said partial address field and said address variation field of the corresponding branch target buffer entry.

6. The system as claimed in claim 5, wherein said maximum address variation range has a number of bits equal to the number of bits of an address offset field of said branch instruction minus a sign bit.

7. The system as claimed in claim 6, wherein said address variation field is the 17th bit to 31st bit of a 32-bit instruction address starting at 0th bit.

8. The system as claimed in claim 6, wherein said address variation field is the 25th bit to 31st bit of a 32-bit instruction address starting at 0th bit.

* * * * *